Oct. 24, 1967  J. D. SYMONS ET AL  3,348,851

SEAL

Filed June 2, 1965

INVENTORS
James D. Symons, &
Louis H. Weinand

J. L. Carpenter
ATTORNEY

United States Patent Office 3,348,851
Patented Oct. 24, 1967

3,348,851
SEAL
James D. Symons, Southfield, and Louis H. Weinand, Warren, Mich., assignors to General Motors Corporation, Detroit, Mich., a corporation of Delaware
Filed June 2, 1965, Ser. No. 460,723
4 Claims. (Cl. 277—134)

ABSTRACT OF THE DISCLOSURE

A fluid seal for sealing the space between a relatively rotating shaft and a housing wherein slits, cut across the seal lip, are held closed by elastomeric forces within the seal during periods of non-relative rotation to provide static sealing and are held open by a torque differential developed at the sides of the slits during relative rotation of the shaft and the housing. The slits are circumferentially angled with respect to a common axis of rotation and develop a dynamic pumping action when the shaft and the housing are relatively rotating that prevents fluid leakage past the seal lip.

---

It is well known that helical grooves or threads, disposed either on a sealing surface or on a surface to be sealed, improve the dynamic sealing of a fluid. However, such grooves or threads have the serious disadvantage of providing a convenient path for the fluid being sealed to leak through under static conditions.

The present invention solves this problem by providing a seal having at least one slit cut into the sealing surface. The slit is closed when the sealing surface engages the surface to be sealed to prevent static leakage therethrough, but opens to provide dynamic sealing when the engaged surfaces move relative to each other.

Accordingly, an object of the present invention is to provide an improved seal.

Another object of the invention is to provide such a seal which effectively provides both static and dynamic sealing.

Another object of the invention is to provide such a seal which has the sealing means in the sealing surface.

A further object is to provide such a seal in which the sealing means includes at least one slit cut into the sealing surface.

The objects and advantages of the invention will be made apparent in the following detailed description of a preferred embodiment of the invention.

Figure 1:
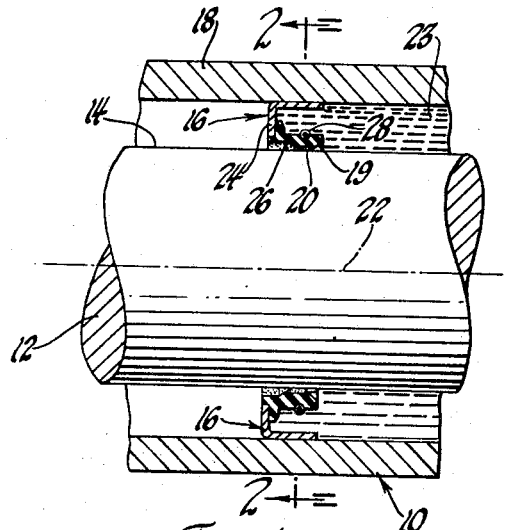
FIGURE 1 is a partially broken away view of a seal installation embodying a seal according to this invention.
Figure 2:
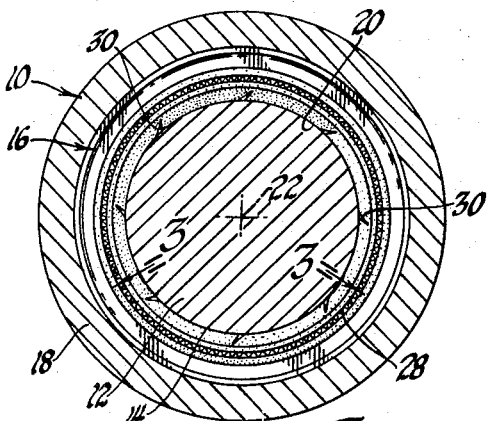
FIGURE 2 is a view taken generally along the plane indicated by line 2—2 of FIGURE 1.

Referring to FIGURES 1 and 2, a seal installation 10 includes a shaft 12 having a surface 14 to be sealed and a seal 16 mounted on a housing 18 and having a seal lip 19 with an axially extending sealing surface 20 in sealing engagement with the surface 14. The shaft 12 and the seal 16 are rotatable relative to each other about a common axis 22. The fluid 23 being sealed, such as oil or some other lubricant, is located to one side of the seal 16 between the shaft 12 and the housing 18.

Figure 4:
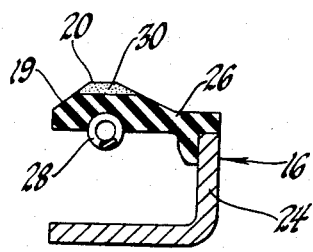
FIGURE 4 is a sectional view taken generally along a plane indicated by line 4—4 of FIGURE 3.

The seal 16, as best shown in FIGURE 4, includes an annular metallic casing 24, L-shaped in cross section, and a sealing annulus 26 of suitable resilient material bonded to the casing 24. A spring member 28 encircles the sealing annulus 26 and exerts a radial load sufficient to urge the sealing surface 20 of the seal lip 19 into sealing engagement with the surface 14.

Figure 3:
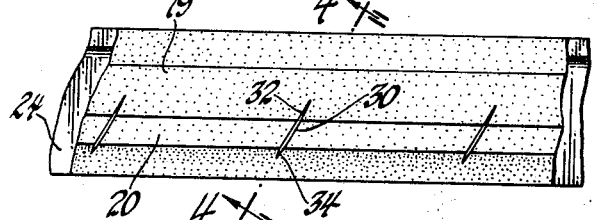
FIGURE 3 is an enlarged view of a portion of the seal taken generally along a plane indicated by line 3—3 of FIGURE 2.

At least one slit 30 is cut into the sealing surface 20 with a razor sharp knife or other suitable tool in such a manner as to ensure that no material is removed by the cutting process. The slit 30 extends axially across and parallel to the sealing surface 20 and lies in a plane which is angled circumferentially of the sealing surface 20, FIGURE 2, and which also intersects the axis 22 of relative rotation of the seal, FIGURE 3. The direction or hand of the slit 30 is dependent upon the direction of relative rotation of the shaft 12 and the seal 16. Thus with the slit orientation shown in FIGURE 2, the shaft 12 will rotate clockwise relative to the seal 16. The angles may be of varying degrees and the slit 30 may be cut to a variable depth within the resilient sealing annulus 26 without impairing the sealing action.

After the cut has been made, the sealing annulus 26 retains a uniform, continuous sealing surface 20 because the slit is held closed by the elastomeric forces within the resilient material. The slit remains closed when the seal 16 is installed over the shaft 12 because of the same internal forces. Upon relative movement between the seal 16 and the shaft 12, however, the slit 30 is forced open by a torque differential which exists across the opposite sides, 32 and 34 of the slit. The torque differential exists because one side of the slit acts as a wiper, pumping the fluid 23 being sealed from beneath the area of engagement of surfaces 14 and 20 and back to the fluid reservoir. The pumping action of the slit 30 thereby improves the dynamic sealing properties of the seal 16. When relative motion between the shaft 12 and the seal 16 stops, the torque differential across the slit 30 does not exist and the sides 32 and 34 press together to prevent static leakage of the fluid 23 through the slit 30.

Figure 5:
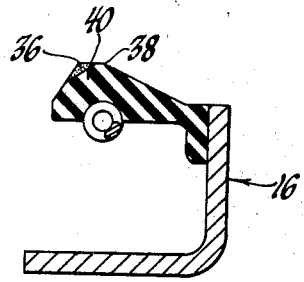
FIGURE 5 is a view similar to FIGURE 4 but showing a modified seal.
Figure 6:
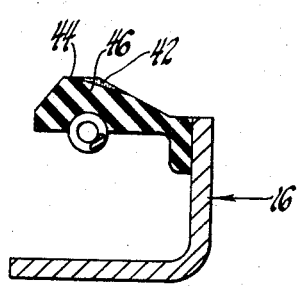
FIGURE 6 is a view similar to FIGURE 4 but showing another modified seal.
Figure 7:
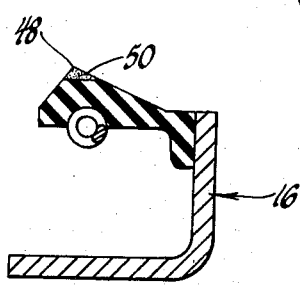
FIGURE 7 is a view similar to FIGURE 4 but showing a further modified seal.

As shown in FIGURES 5 through 7, the slit may be cut into various portions of a seal lip. In certain installations, it may not be necessary that the slit extend across the full width of the sealing surface as it does in FIGURE 4. In FIGURE 5, the slit 36 precedes a static sealing portion 38 of the seal lip 40, locating the slit, according to conventional seal mounting practices, on the fluid side of the seal. FIGURE 6 shows a similar seal in which the slit 42 follows a static sealing portion 44 of the seal lip 46. Since the slit extends through only a portion of the sealing surface in both of the preceding seals, it is obvious that static sealing is ensured even though the slit may not be closed. It is intended, however, that the slit close in every case when relative rotation stops.

FIGURE 7 shows an application of the invention to a seal having a line contact sealing lip 48. A slit 50 is cut through the seal lip to provide dynamic sealing. As in each of the preceding seals, the slit is cut in such a manner that no material is removed in the cutting process and the slit lies in a plane which is angled circumferentially of the seal, and which also intersects the axis of relative rotation.

Thus this invention discloses a seal having improved dynamic and static sealing properties.

We claim:

1. A seal for sealing the space between relatively rotating members having a common axis of rotation comprising a resilient seal connected to one of the members and having a seal lip including an axially extending sealing surface circumferentially and sealingly engaging a surface of the other of said members, at least one slit cut into and extending axially across the sealing surface, said slit held closed by elastomeric forces within the resilient seal upon non-relative rotation of said members and held open by a torque differential developed on opposite sides of the slit during relative rotation of said members.

2. The invention as recited in claim 1 wherein said slit is located in a plane that is circumferentially angled in the direction of relative rotation of the members and intersects the common axis of rotation.

3. The invention as recited in claim 1 wherein the slit is cut parallel to the sealing surface.

4. A fluid seal for sealing the space between relatively rotating members having a common axis of rotation comprising a resilient seal connected to one of the members and having a seal lip including an axially extending sealing surface circumferentially and sealingly engaging a surface of the other of said members, at least one slit cut into the seal lip and extending axially across and parallel to the sealing surface, said slit located in a plane that is circumferentially angled in the direction of relative rotation of the members and intersects the common axis of rotation, elastomeric forces within the seal holding the slit closed during non-relative rotation of the members, and a torque differential developed on opposite sides of the slit opening the slit upon relative rotation of the members.

References Cited

FOREIGN PATENTS 1,101,074   3/1961   Germany.
1,153,578   8/1963   Germany.

SAMUEL ROTHBERG, *Primary Examiner.*